(12) United States Patent
Merrick

(10) Patent No.: US 6,315,232 B1
(45) Date of Patent: Nov. 13, 2001

(54) RETRACTOR BELT BOOT SCRAPER

(75) Inventor: David D. Merrick, Cicero, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 09/519,982

(22) Filed: Mar. 7, 2000

(51) Int. Cl.[7] .................................................. B60R 22/34

(52) U.S. Cl. ..................... 242/379; 280/807; 297/475; 15/256.5

(58) Field of Search ................. 242/379; 280/801.1, 280/807; 297/474, 475; 15/256.5

(56) References Cited

U.S. PATENT DOCUMENTS

| 4,911,377 | 3/1990 | Lortz et al. |
| 5,497,956 | 3/1996 | Crook ................. 242/382.1 |

*Primary Examiner*—John Q. Nguyen
(74) *Attorney, Agent, or Firm*—Woodard, Emhardt, Naughton Moriarty & McNett

(57) ABSTRACT

A retractor and boot for limiting passage of dirt and foreign material on the retractor belt. The boot includes a plastic housing surrounding the retractor and has an outwardly extending portion forming a channel through which the belt is movable. A pair of scraping edges are located offset along the longitudinal channel axis and are spaced apart relative to each other a distance less than the belt thickness allowing dirt and foreign material to be scraped from the belt as the belt is retracted.

13 Claims, 4 Drawing Sheets

RETRACTOR BELT BOOT SCRAPER

BACKGROUND OF THE INVENTION

1. Field of the Invention

This invention is in the field of housings for enclosing vehicle belt retractors.

2. Description of the Prior Art

Automatic locking retractors and inertia locking retractors each include a spool rotatably mounted to a frame with a belt wrappingly mounted to the spool. Typically, the retractors are mounted within plastic housings to conceal the spool and limit access thereto. In certain instances, dirt and foreign material becomes caked or attached to the belt which is then withdrawn into the retractor. Disclosed herein is a boot or housing which extends around the retractor with the boot having an entrance slot through which the belt passes. The slot is designed to engage the belt and remove dirt and foreign material from the belt as the belt is withdrawn into the retractor.

SUMMARY OF THE INVENTION

One embodiment of the present invention is a device for scraping dirt and foreign material from a belt extending from a vehicle restraint retractor comprising a housing extending around the retractor and including a channel through which the belt extends from the retractor and outwardly of the housing. The housing includes offset scrapers on opposite sides of the channel to contact the belt and scrape the belt as it is retracted through the channel. The scrapers are spaced apart and sized relative to the belt to minimize passage of the dirt and foreign material into the retractor.

It is an object of the present invention to provide a new and improved boot or housing for enclosing a vehicle belt retractor.

A further object of the present invention is to provide a belt retractor boot having means for allowing the retractor to be slipped into and mounted within the boot which is then locked thereto.

A further object of the present invention is to provide a device for protecting a vehicle restraint belt retractor from dirt and foreign material.

An additional object of the present invention is to provide a device for scraping dirt and foreign material from a vehicle retractor belt.

Related objects and advantages of the present invention will be apparent from the following description.

DESCRIPTION OF THE PREFERRED EMBODIMENT

Figure 1:
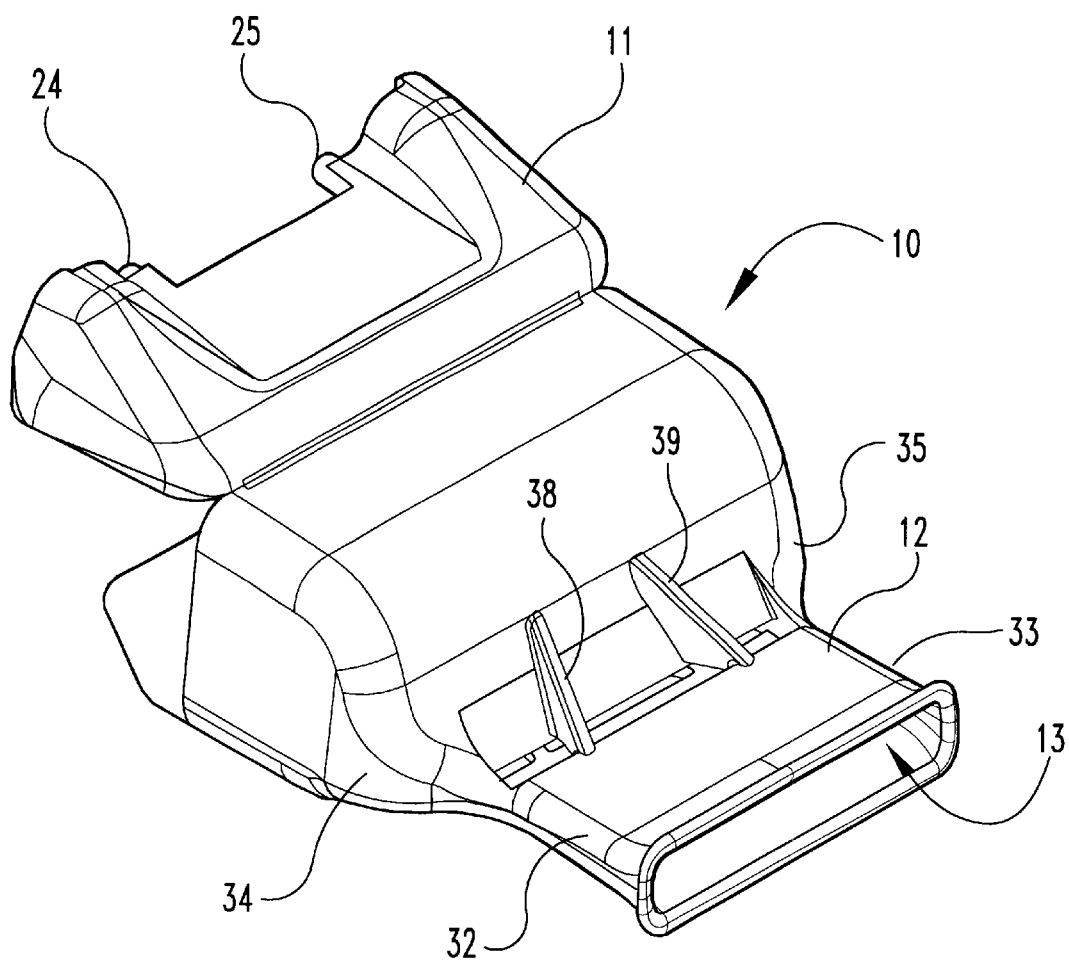
FIG. 1 is a perspective view of the retractor boot in the opened condition and without a retractor and belt mounted therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a housing or boot 10 for enclosing a standard vehicle belt retractor. Boot 10 is a plastic housing having a door 11 hingedly mounted to the top and rear thereof. Door 11 may be swung upwardly to allow for insertion and mounting of the retractor and associated belt within the housing. The door may then be pivoted downward and locked in place. Integrally connected to the front of housing 10 is a tubular shaped extension 12 defining a channel 13 through which the belt moves to and from the retractor spool located within the housing and upon which the belt is wrappingly mounted.

Figure 4:
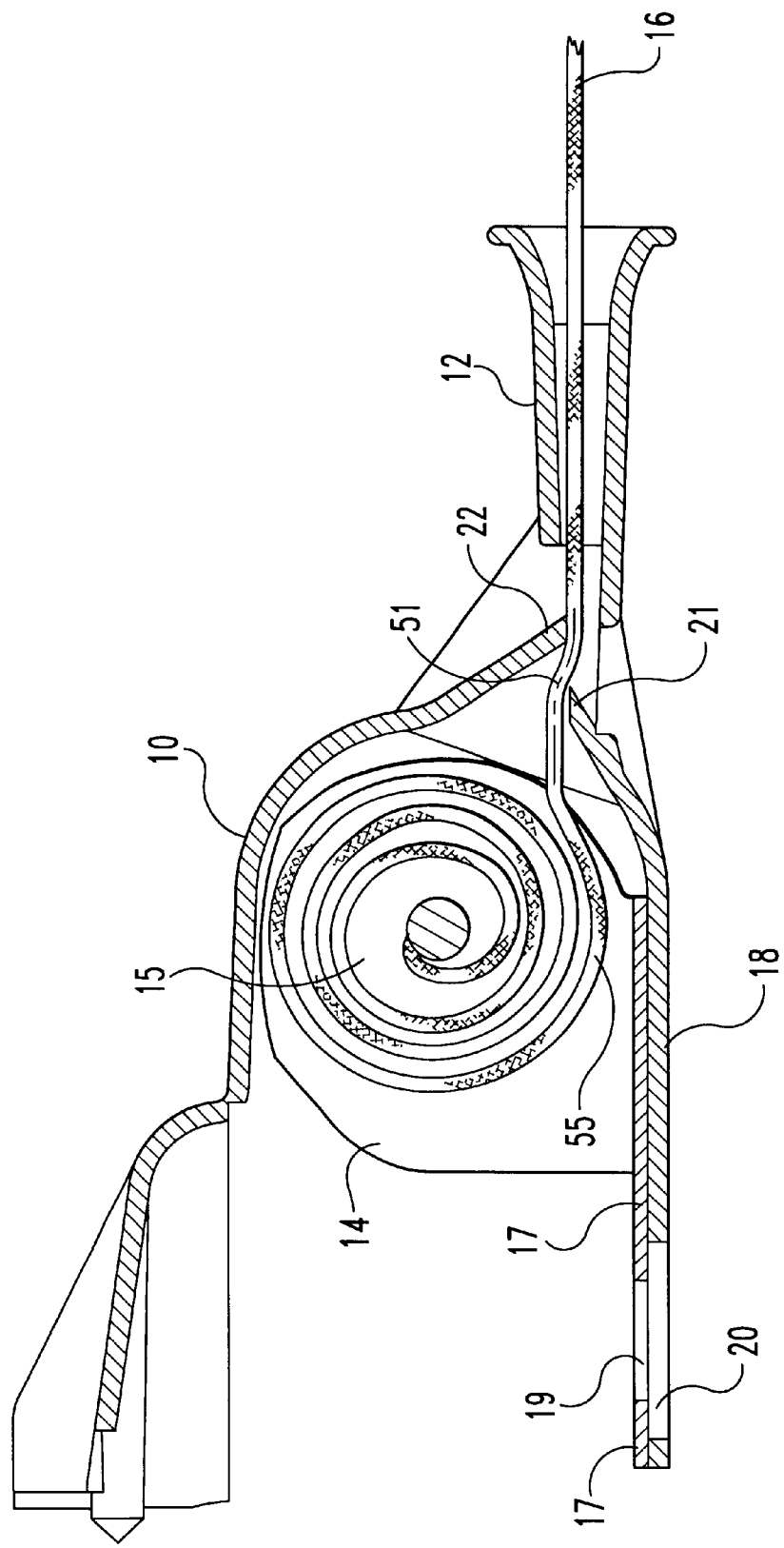
FIG. 4 is the same view as FIG. 3 only showing the retractor and belt mounted within the boot.

Retractor 14 is shown in cross-section in FIG. 4 and has been removed from the remaining figures to more clearly illustrate the construction of the boot. Retractor 14 is of conventional design. For example, retractor 14 may take the form of the retractor disclosed in the commonly owned U.S. Pat. Nos. 4,911,377 and 5,497,956 which are herewith incorporated by reference. Alternatively, other commercially available retractors may be utilized in combination with the boot shown in the drawings. Retractor 14 includes a spool 15 having a belt 16 wrappingly mounted thereon. The main frame of the retractor includes a bottom base wall 17 resting atop the bottom wall 18 of housing 10. Wall 17 includes an aperture 19 aligned with aperture 20 of wall 18 allowing a conventional fastening device, such as a bolt, to extend therethrough fixedly securing the retractor and boot to the vehicle. Belt 16 extends outwardly between edges 21 and 22 and then through tubular extension 12 to a location external of the housing. The distal end of the belt has affixed thereto a conventional locking device, such as a tongue, to lockingly engage a conventional belt buckle.

Figure 2:
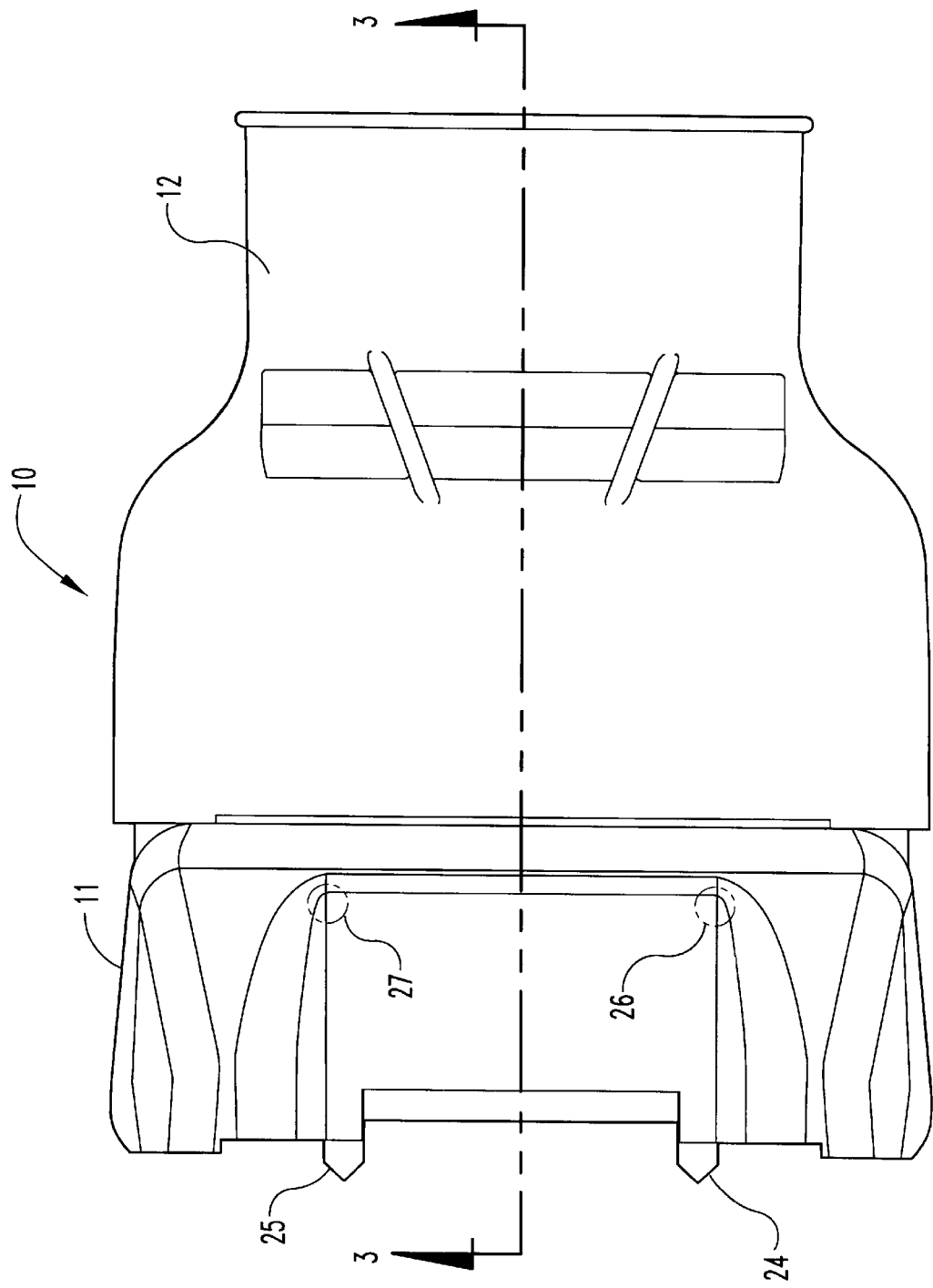
FIG. 2 is an enlarged top view of the boot of FIG. 1.
Figure 3:
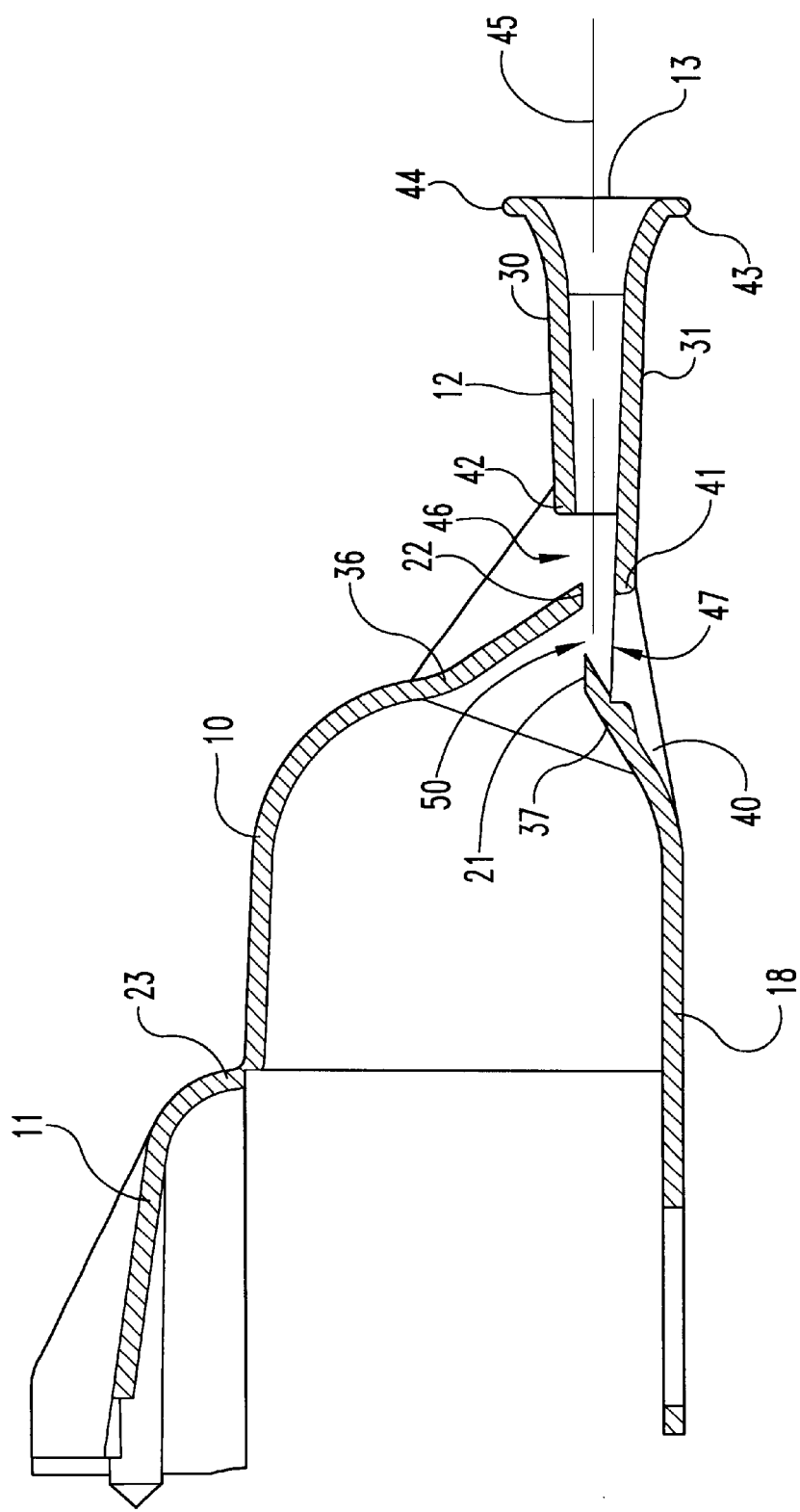
FIG. 3 is a cross-sectional view taken along a line and viewed in the direction of arrows 3—3 of FIG. 2.

Door 11 includes a proximal end 23 (FIG. 3) integrally joined to the top wall of housing 10 by means of a living hinge. Thus, the door may be swung downwardly and secured to the bottom wall 18 of housing 10 by means of a pair of legs 24 and 25 (FIG. 1) which extend through a pair of apertures 26 and 27 (FIG. 2) formed in the bottom wall 18 (FIG. 3) of housing 10. Legs 24 and 25 have sufficient length so they normally interfere with bottom wall 18 as the door is swung downwardly with the legs then being forced toward and into holes 26 and 27. The legs are then joined to wall 18 while within holes 26 and 27 by suitable fastening means such as heat or adhesive. Door 11 thereby allows for the initial insertion of the retractor and belt into the housing which then extends completely around and encloses the retractor.

Housing 10 is of a unitary and integral construction with the top wall, sidewalls, and bottom wall integrally joined together and to door 11. Likewise, tubular extension 12 is integrally joined and is of unitary construction with the remaining portion of the housing.

Tubular extension 12 includes a top wall 30 (FIG. 3) and bottom wall 31 integrally joined to a pair of sidewalls 32 and 33 (FIG. 1) with the walls being spaced apart forming channel 13. Side walls 32 and 33 are integrally joined to the side walls 34 and 35 of the housing whereas top wall 30 is spaced apart by a slot or opening 46 from the downward sloping front wall 36 of the housing and with bottom wall 31 spaced apart by an opening or slot 47 from the upwardly extending forward portion 37 of bottom wall 18. A pair of optional ribs 38 and 39 (FIG. 1) are integrally joined to and extend between forward wall 36 and top wall 30 to add rigidity to the boot. Likewise, a pair of spaced apart ribs 40 (FIG. 3) may optionally be used to integrally join the upwardly sloping front end 37 of bottom wall 18 with bottom wall 31 increasing the rigidity of the boot.

Walls 30 and 31 diverge apart in a direction from the proximal ends 41 and 42 respectively of bottom wall 31 and top wall 30 to the distal ends 43 and 44 which flare outwardly. Thus, walls 30 and 31 direct and guide belt 16 (FIG. 4) along a straight path following the longitudinal axis 45 of channel 13. Walls 30 and 31 are spaced sufficiently apart to allow the belt to move freely therethrough.

Edges 21 and 22 of walls 37 and 36 provide a scraping action as the belt extends between the edges as the belt is retracted and wrapped onto spool 15. The edges provide offset scrapers extending from the opposite sides of channel 13 to contact the opposite sides of the belt 16 thereby scraping the dirt and foreign material from the belt as the belt is retracted into the boot. The scrapers or edges are spaced apart and sized relative to the belt to minimize passage of dirt and foreign material to the retractor. More specifically, edges 21 and 22 extend across the entire width of the opposite sides of belt 16. Further, edges 21 and 22 are located at different positions along axis 45 being offset along the length thereof. Edge 22 is located on axis 45 at a more forward position and further apart from spool 15 as compared to edge 21 which is located in a more aft position on axis 45 closer to the spool than edge 22. Thus, a gap 50 (FIG. 3) is formed between edges 21 and 22. In addition, edges 21 and 22 are located apart from axis 45 a combined distance less than the thickness of the belt requiring the belt to extend curvingly along a serpentine path 51 (FIG. 4) as the belt extends past the edges. In the embodiment depicted in the drawings, edges 21 and 22 are aligned with axis 45 (FIG. 3) and thus are not spaced apart from the axis. In order for the belt to pass between the edges, the belt must follow a path from the straight path along axis 45 as the belt passes between walls 30 and 31 to a curved or serpentine path 51 as the belt moves through gap 50. The thickness of belt 16 is arranged in a direction perpendicular to axis 45 as the belt passes through channel 13. Edges 21 and 22 are offset relative to each other along axis 45 and are located relative to each other in the perpendicular direction relative to axis 45 less than the thickness of the belt directing the belt along a serpentine path thereby engaging and scraping off dirt and foreign material from the belt as the belt is retracted. Channel 13 is operable to guide the belt in a straight path toward the scraping edges whereat the path is then changed from a straight path to the serpentine path. In addition, edge 21, located between bottom wall 18 and web 16 is located at a higher elevation than the bottom most portion 55 (FIG. 4) of the spool thereby forcing the belt onto scraping edge 21 as the belt is retracted.

Channel 13 is funnel shaped allowing the belt and any dirt and foreign material attached thereto to pass through the channel to first edge 22 and then edge 21. Openings 46 and 47 extend across the width of respectively the top and bottom of the belt allowing the dirt and foreign material removed by the edges to escape the boot. Edges 21 and 22 are particularly useful in frictionally engaging the belt thereby to scrape the dirt and foreign material therefrom. The scrapers or edges 21 and 22 are offset along the longitudinal axis to avoid pinching of the belt as the belt is moved through gap 50.

Many variations are contemplated and included in the present invention. For example, the retractor and boot may be used in combination with a lap belt and also in combination with a three-point shoulder lap-belt. As such, the boot and retractor are not limited in the particular application.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for protecting a vehicle restraint belt retractor from dirt and foreign material and for scraping dirt and foreign material from a belt extending in a first direction from the retractor comprising:

a housing extendable around said retractor and including a channel through which the belt may extend from said retractor and outwardly of said housing, said housing includes offset scrapers on opposite sides of said channel to contact said belt and scrape dirt and foreign material therefrom as said belt is retracted through said channel, said scrapers being spaced apart and sized relative to said belt to minimize passage of said dirt and foreign material to said retractor.

2. The device of claim 1 wherein:

said scrapers include a first scraper with a first edge and a second scraper with a second edge, said first edge and said second edge extend entirely across opposite sides of said belt when said belt extends through said channel.

3. The device of claim 2 wherein:

said channel includes a longitudinal axis with said belt extending therealong, said first edge located at a different position along said axis than said second edge, said first edge and said second edge located relative to said axis a combined distance less than the thickness of said belt requiring said belt to extend curvingly through said channel as said belt extends past said first edge and said second edge.

4. The device of claim 2 wherein:

said first scraper and said second scraper are each a wall extending outwardly from said housing toward said first edge and said second edge.

5. A belt retracting apparatus protected from dirt and foreign material comprising:

a belt retractor having a belt with a belt longitudinal axis and a belt thickness arranged in a perpendicular direction to said axis, said belt wound on said retractor but extendable and retractable therefrom;

a housing at least partially enclosing said belt retractor to protect said retractor from dirt and foreign material, said housing having a first scraping edge and a second scraping edge offset relative to each other along said belt longitudinal axis and located relative to each other in said perpendicular direction less than the thickness of said belt directing said belt along a serpentine path thereby engaging and scraping off dirt and foreign material from said belt as said belt is retracted.

6. The apparatus of claim 5 wherein:

said housing includes a guide integral therewith which includes a pair of spaced apart walls defining a channel through which said belt extends and is guided in a straight path toward said first scraping edge and said second scraping edge whereat said first scraping edge and said second scraping edge change the path of said belt from said straight path to said serpentine path.

7. The apparatus of claim 6 wherein:

said housing includes an opening between said first scraping edge and said second scraping edge through which dirt and foreign material may fall therefrom when scraped from said belt.

8. The apparatus of claim 7 wherein:

said housing includes a door hingedly mounted thereon to facilitate insertion of said retractor into said housing with said door including locking means to lock said door when closed.

9. The apparatus of claim 7 wherein:

said retractor includes a frame with a mounting base and a spool rotatably mounted to said frame and elevated above said base, said first scraping edge is located between said belt and said base and is positioned closer to said spool than said second scraping edge, said belt extending from said first scraping edge to between said base and said spool and then wrapping therearound.

10. The apparatus of claim 6 wherein:

said pair of spaced apart walls of said guide extend divergingly apart as said walls extend away from said retractor forming a funnel shaped channel to guide said belt toward said retractor.

11. A device for removing dirt and foreign material from a belt wrappingly mounted on a retractor:

a main frame mountable to a retractor, said main frame includes a slot through which a belt of said retractor is movable, said main frame further includes a pair of edges located adjacent said slot and arranged relative to each other defining a serpentine path through which said belt must pass as said belt retracts through said slot and past said pair of edges removing dirt and foreign material from said belt.

12. The device of claim 11 wherein:

said main frame is a housing with a pair of walls forming a channel through which said belt is extendable, said channel includes a longitudinal axis with said pair of edges arranged offset relative to each other along said axis and located relative to said axis to force said belt in said serpentine path frictionally past each of said edges removing dirt and foreign material therefrom as said belt moves through said channel.

13. The device of claim 12 wherein:

said pair of walls extend divergingly apart as said walls extend outwardly from said housing to form a funnel shaped channel guiding said belt along a straight path toward said pair of edges.

* * * * *